(12) United States Patent
Osawa

(10) Patent No.: US 10,162,493 B2
(45) Date of Patent: Dec. 25, 2018

(54) INFORMATION PROCESSING APPARATUS, INFORMATION PROCESSING APPARATUS CONTROL METHOD AND STORAGE MEDIUM

(71) Applicant: CANON KABUSHIKI KAISHA, Tokyo (JP)

(72) Inventor: Shunsuke Osawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 774 days.

(21) Appl. No.: 14/263,533

(22) Filed: Apr. 28, 2014

(65) Prior Publication Data

US 2014/0325386 A1 Oct. 30, 2014

(30) Foreign Application Priority Data

Apr. 30, 2013 (JP) ................................ 2013-095478

(51) Int. Cl.
*G06F 3/048* (2013.01)
*G06F 3/0484* (2013.01)
*G06Q 10/10* (2012.01)

(52) U.S. Cl.
CPC ....... *G06F 3/04842* (2013.01); *G06Q 10/107* (2013.01)

(58) Field of Classification Search
None
See application file for complete search history.

(56) References Cited

U.S. PATENT DOCUMENTS

| | | | |
|---|---|---|---|
| 6,370,553 B1* | 4/2002 | Edwards | G06F 17/21 707/999.01 |
| 8,015,318 B2 | 9/2011 | Kosaka et al. | |
| 2002/0046247 A1 | 4/2002 | Iwase et al. | |
| 2008/0134024 A1* | 6/2008 | Masuda | G06F 17/217 715/255 |
| 2008/0244092 A1 | 10/2008 | Kosaka et al. | |
| 2009/0276732 A1* | 11/2009 | Dervan | G06Q 10/107 715/853 |
| 2012/0250083 A1 | 10/2012 | Kobashi | |

FOREIGN PATENT DOCUMENTS

| | | |
|---|---|---|
| JP | 2002-123471 | 4/2002 |
| JP | 2006-268701 | 10/2006 |
| JP | 2008-257346 A | 10/2008 |
| JP | 2009-75893 A | 4/2009 |
| JP | 2010-67140 A | 3/2010 |
| JP | 2010-79889 A | 4/2010 |
| JP | 2012-216147 A | 11/2012 |

OTHER PUBLICATIONS

Office Action issued in Japanese Patent App. No. 2013-095478 dated Feb. 14, 2017 (8 pages including translation).

* cited by examiner

*Primary Examiner* — William C Trapanese
(74) *Attorney, Agent, or Firm* — Fitzpatrick, Cella, Harper & Scinto

(57) ABSTRACT

An information processing apparatus is provided that inputs a plurality of mail files generated by a mail application, displays a mail body text and an attached file included in the respective mail files, selects at least one of the mail body text and the attached file that is to be incorporated in an electronic binder from among the displayed mail body text and the displayed attached file included in the respective mail files, and creates the electronic binder based on the mail body text or the attached file selected by the selection unit.

15 Claims, 15 Drawing Sheets

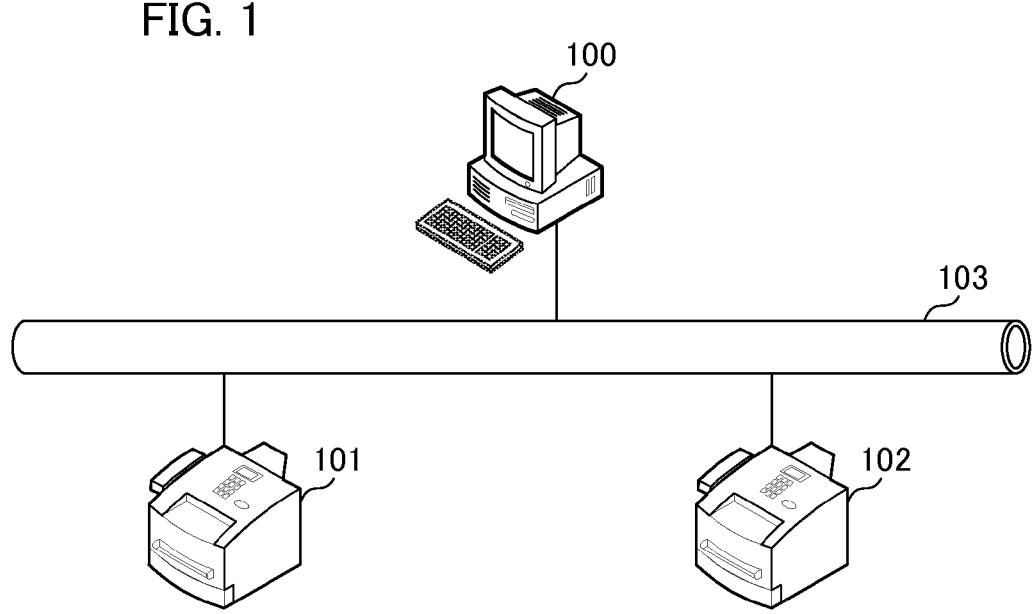
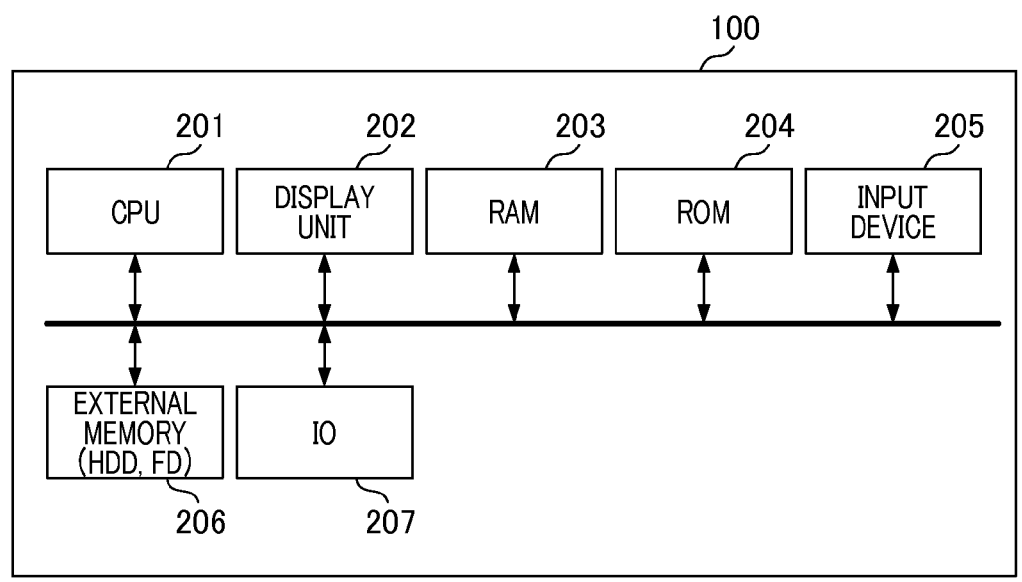

FIG. 5B

| Setting contents | Setting contents |
|---|---|
| Output paper size | A3, A4, A5, B4, B5, Letter, Leisure, Legal··· |
| Output paper orientation | Portrait/Landscape |
| Page aggregation setting | 1in1, 2in1, 4in1, 6in1, 8in1, 9in1, 16in1, |
| Duplex/Single printing | Duplex, Single |
| Color mode | Color, Monochrome |

FIG. 5C

| Setting contents | Setting contents |
|---|---|
| Chapter specific setting flag | ON, OFF |
| Output paper size | A3, A4, A5, B4, B5, Letter, Leisure, Legal··· |
| Output paper orientation | Portrait/Landscape |
| Page aggregation setting | 1in1, 2in1, 4in1, 6in1, 8in1, 9in1, 16in1, |
| Duplex/Single printing | Duplex, Single |
| Color mode | Color, Monochrome |

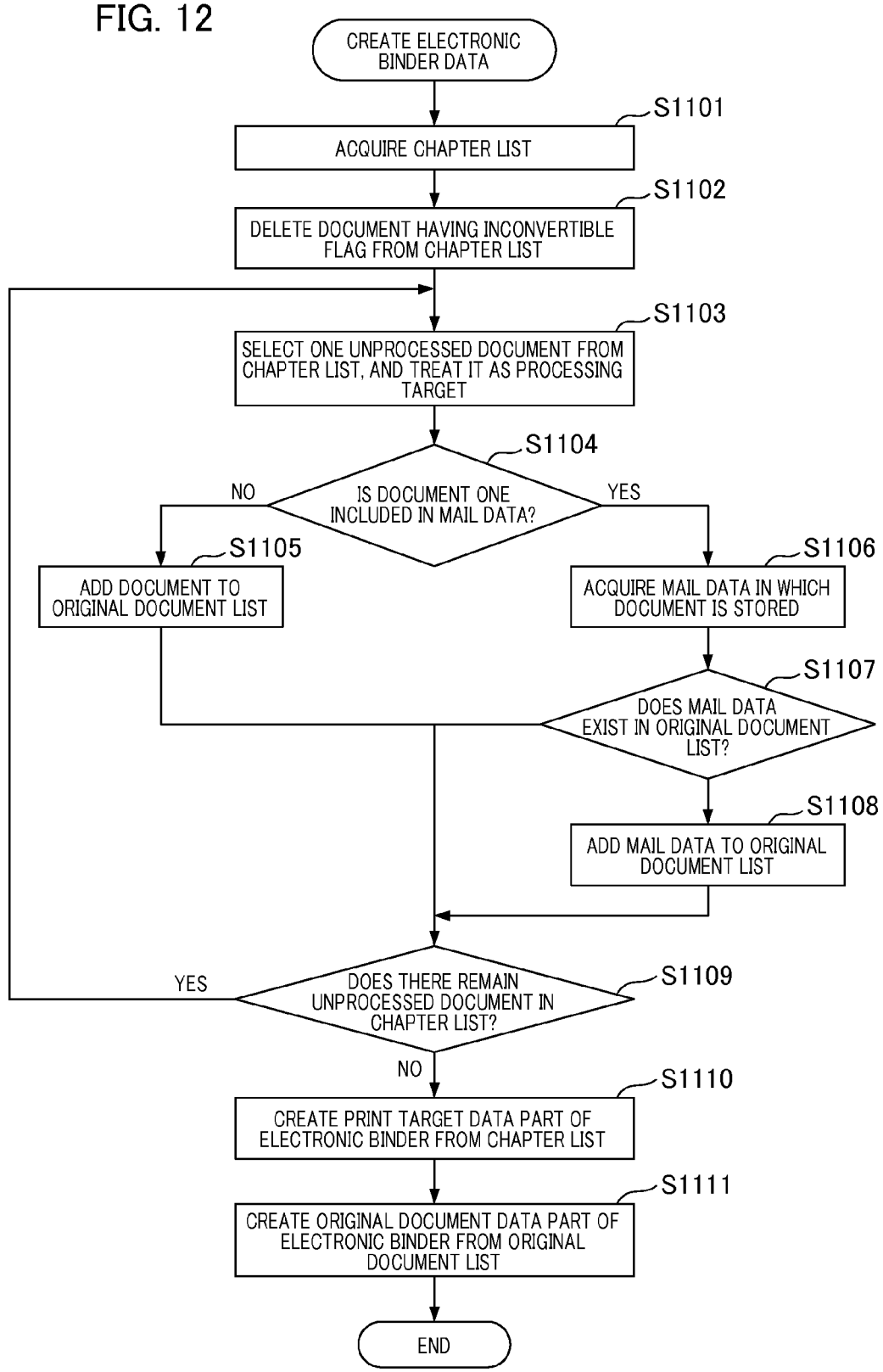

INFORMATION PROCESSING APPARATUS, INFORMATION PROCESSING APPARATUS CONTROL METHOD AND STORAGE MEDIUM

BACKGROUND OF THE INVENTION

Field of the Invention

The present invention relates to an information processing apparatus, an information processing apparatus control method and storage medium.

Description of the Related Art

E-mails are exchanged between personal computers (PC) connected to a network such as the Internet. These e-mails are exchanged using an e-mail address possessed by each user. Also, these e-mails are temporarily accumulated in a mail server inside the Internet. A user receives an e-mail having a corresponding e-mail address from the mail server by using a user ID, a password or the like that is set in the PC in advance, and confirms the received e-mail on a screen of the PC. Also, the user can attach information such as an image to the e-mail as an attached file. At this time, the user may print the attached file for distributing it or confirming its contents. Japanese Patent Laid-Open No. 2010-67140 discloses an image processing apparatus that automatically prints an attached file attached to an e-mail in addition to a body text in the e-mail when the attached file is attached to the e-mail.

However, in the image processing apparatus disclosed in Japanese Patent Laid-Open No. 2010-67140, all of the body text and the attached file in the e-mail is subject to print processing, which may result in printing of unnecessary contents for the user.

SUMMARY OF THE INVENTION

An information processing apparatus according to an aspect of the present invention includes an input unit configured to input a plurality of mail files generated by a mail application; a display unit configured to display a mail body text and an attached file included in the respective mail files; a selection unit configured to select at least one of the mail body text and the attached file that is to be incorporated in an electronic binder from among the mail body text and the attached file included in the respective mail files displayed by the display unit; and a creation unit configured to create the electronic binder based on the mail body text or the attached file selected by the selection unit Further features of the present invention will become apparent from the following description of exemplary embodiments (with reference to the attached drawings).

BRIEF DESCRIPTION OF THE DRAWINGS

FIG. 1 illustrates a configuration example of a data processing system according to one embodiment of the present invention.

FIG. 2 illustrates an example of a hardware configuration of an information processing apparatus.

FIG. 5A to FIG. 5C are schematic formats illustrating a structure of document data and contents of attribute information.

FIG. 12 is a diagram of a detailed processing flow when the electronic binder is created.

DESCRIPTION OF THE EMBODIMENTS

First Embodiment

<System Configuration>

Figure 3:
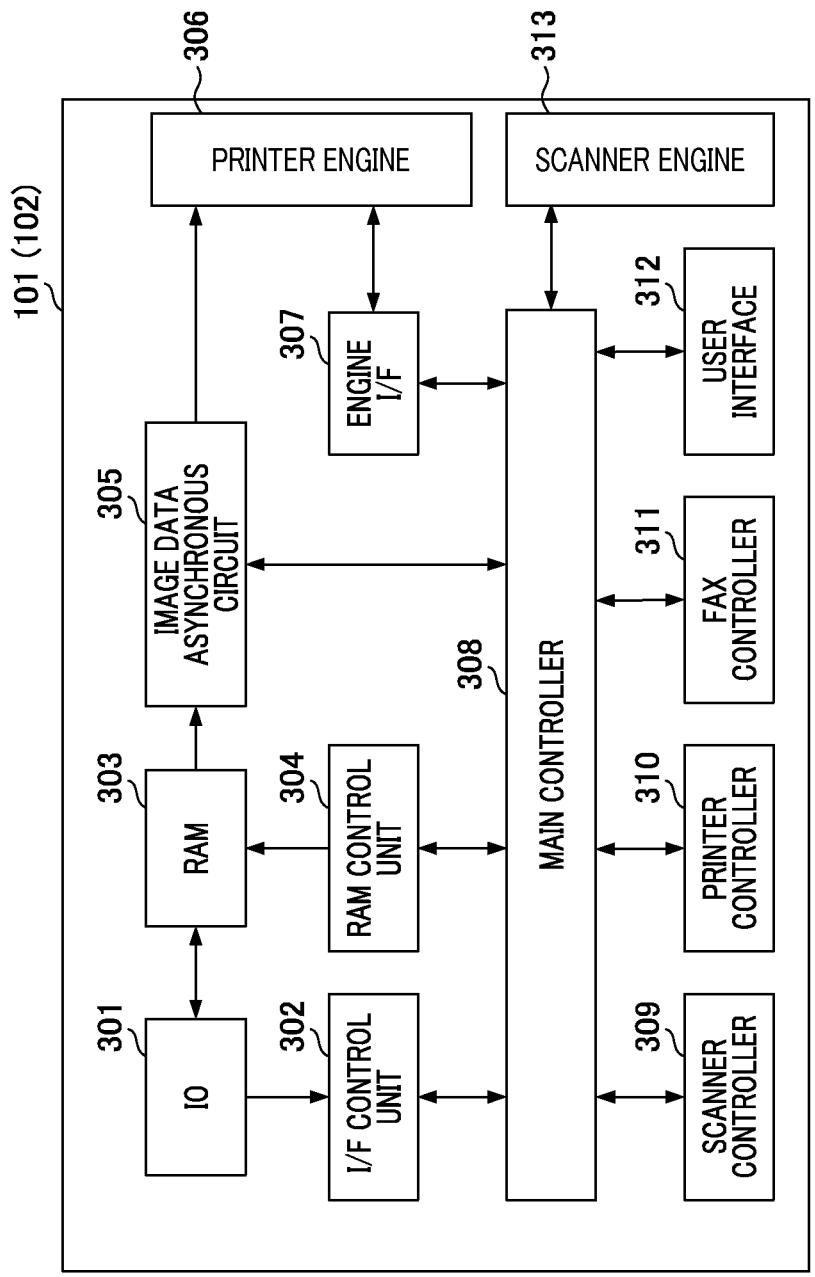
FIG. 3 illustrates an example of a hardware configuration of an image processing apparatus.

FIG. 1 is a diagram illustrating a configuration of a data processing system according to one embodiment of the present invention. The data processing system includes an information processing apparatus 100, and image processing apparatuses 101 and 102. The information processing apparatus 100, and the image processing apparatus 101, and the image processing apparatus 102 can communicate via a network 103. The network 103 is a LAN (Local Area Network) in the present embodiment, and may be wired or wireless. The information processing apparatus 100 is a general-purpose computer used by a user for instructing the image processing apparatuses 101 and 102 about printing or fax transmission. The image processing apparatuses 101 and 102 are a multifunction peripheral including a printer function, a facsimile function, a copy function, a scanner function, a file transmission function, and the like, but may be an apparatus including only the printer function. Note that a predetermined operating system (OS) as well as various applications for executing specific functional processing are installed on the information processing apparatus 100. Here, the specific functional processing includes document processing, spreadsheet processing, presentation processing, image processing, graphic processing, and the like. Also, a mail application that sends and receives mails through a mail server or the like is installed on the information processing apparatus 100. Each of the applications has a unique data structure (a file structure). In addition, the OS has a structure in which a print instruction is performed on a corresponding application with reference to an identifier in each file.

Also, an electronic binder application is installed on the information processing apparatus 100. The electronic binder application has a function that converts a plurality of different documents, such as documents having different extensions to a unified electronic document format. The electronic binder application also has a function for converting a body text in a mail file generated by the mail application and an attached file to the electronic document format. Hereinafter, e-mail data may be simply described as "mail data". In the present embodiment, the mail file refers to the mail data overall generated by the mail application, and includes the body text and the attached file. Also, the attached file refers to the electronic document attached to the mail file, and the mail data other than the body text may be attached. Also, the electronic binder refers to a file in which one or more files selected by a user are incorporated and the selected files are subject to conversion processing for converting them to one unified document. Thus, the electronic binder can be called as "electronic binder file".

<Hardware Configuration (the Information Processing Apparatus)>

FIG. 2 is a diagram illustrating a hardware configuration of the information processing apparatus 100 shown in FIG. 1. As shown in FIG. 2, the information processing apparatus 100 includes a CPU 201, a display unit 202, a RAM 203, a ROM 204, an input device 205, an external memory 206, and an IO 207. Each unit is connected via a bus. CPU is abbreviation for "Central Processing Unit". RAM is abbreviation for "Random Access Memory". ROM is abbreviation for "Read Only Memory".

The CPU 201 reads out various programs and application stored in the ROM 204 or the external memory 206 to the RAM 203, and analyzes them so as to thereby execute various processes. For example, control programs for controlling performance by the information processing apparatus 100 are stored in the ROM 204, and the CPU 201 executes these programs so as to control the performance overall by the information processing apparatus 100. The external memory 206 may be an HDD (Hard Disk Drive) or an FDD (Flexible Disk Drive), but is not limited thereto. Also, various programs and execution information may be stored in any one of a storage unit such as the RAM 203, the ROM 204, and the external memory 206.

The display unit 202 gives visual feedback of output information to a user. The input device 205 receives a user operational input via a keyboard or a pointing device. The I/O (Input/Output) 207 is an interface for communicating with an external device. The type of connection to a peripheral may be wired or wireless. The information processing apparatus 100 connects to the image processing apparatuses 101 and 102 via the I/O 207. Note that, a control method in the present embodiment is a control method for the information processing apparatus shown in FIG. 2. A computer program in the present embodiment causes the computer to execute the control method.

<Hardware Configuration (Image Processing Apparatus)>

FIG. 3 is a block diagram illustrating a hardware configuration inside the image processing apparatuses 101 and 102 shown in FIG. 1. In this embodiment, an example is shown of a multifunction peripheral (MFP) having a scanner function, a printer function and a facsimile function. In the following, a hardware configuration is described using the image processing apparatus 101 as an example. The image processing apparatus 101 includes an I/O 301, an I/F control unit 302, a RAM 303, a RAM control unit 304, an image data pace circuit 305, a printer engine 306, an engine I/F 307, and a main controller 308. The image processing apparatus 101 also includes a scanner controller 309, a printer controller 310, a fax controller 311, a user interface 312, and a scanner engine 313.

The I/O 301 connects to the information processing apparatus 100 via a communication medium such as the network (LAN) 103. The I/O 301 may be mounted in plurality for responding to a plurality of connection types. The image processing apparatus 101 passes a device ID and a scanned image to the information processing apparatus 100 via the I/O. The image processing apparatus 101 performs processing in response to various control commands accepted from the I/O.

The I/F control unit 302 performs control in which a device ID is issued to a processing-type-device such as a scanner, a printer, or a facsimile mounted on the image processing apparatus 101. The RAM 303 is a temporary storage device, and stores external data such as a control command acquired by the I/O 301, or an image read by the scanner engine 313. Additionally, the RAM 303 stores an image expanded by the printer controller 310 before the image is passed to the printer engine 306. The RAM control unit 304 manages allocation for the RAM 303. The image data pace circuit 305 is an output device that outputs an image taken by the printer controller 310 or the scanner engine 313 and expanded by the RAM control unit 304 in synchronization with rotation of the printer engine 306. The printer engine 306 develops an image on an output media such as a paper sheet.

The main controller 308 controls the overall performance by the image processing apparatus 101. For example, the main controller 308 performs various controls for the printer engine 306 via the engine I/F 307. The main controller 308 also appropriately sorts a control language acquired from the information processing apparatus 100 via the I/O 301 into the scanner controller 309, the printer controller 310, or the fax controller 311. Additionally, the main controller 308 accepts an instruction from the respective controllers or the user interface 312 and controls the printer engine 306 or the scanner engine 313.

By unifying control interfaces between the main controller 308 and various controllers, an expanded board being capable of processing plural types of control commands can be mounted on one peripheral device. Acquiring a device ID of an expanded controller currently mounted from the respective controllers and managing it is a roll for the main controller 308.

The scanner controller 309 resolves a scan control command accepted from the information processing apparatus 100 into an internal execution command that is interpretable by the main controller 308. The scanner controller 309 also modifies the image read by the scanner engine 313 according to the scan control command.

The printer controller 310 resolves a page description language accepted from the information processing apparatus 100 into an internal execution command including an expanded image of the page description language that is interpretable by the main controller 308. The expanded image is conveyed to the printer engine so as to be printed on an output media such as a paper medium.

The fax controller 311 develops a facsimile control, expands a facsimile control language accepted from the information processing apparatus 100 to an image, and forwards it to other facsimile device or an IP-FAX via a public line or the Internet (not shown).

The user interface 312 is used as an input unit for performing instructions by a user when the image processing apparatus 101 performs various settings for the main controller 308, or directly executes the scanner function, the printer function, or the facsimile function. In response to an instruction by the main controller 308, the scanner engine 313 reads an image scanned by an optical device, converts it to electrical signals, and then passes it to the main controller 308.

<Software Configuration Diagram>

Figure 4:
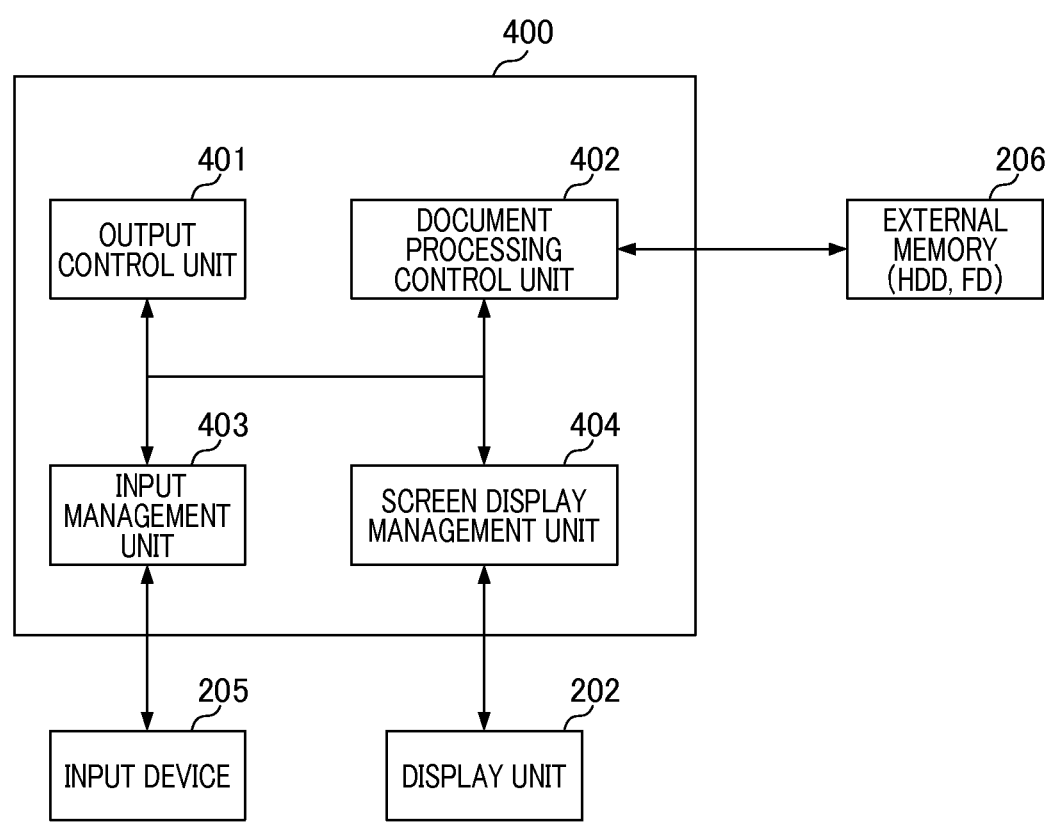
FIG. 4 illustrates an example of a software configuration of an electronic binder application.

FIG. 4 is a diagram of an example of a functional configuration of an electronic binder application 400 included in the information processing apparatus 100. The electronic binder application 400 includes an output control unit 401, a document processing control unit 402, an input management unit 403, and a screen display management unit 404. As shown in FIG. 4, the electronic binder application 400 is mutually communicable with the input device 205, the display unit 202, the external memory 206, or the like. The input management unit 403 detects an operation of the input device 205 by a user via a GUI (graphical user interface) of the electronic binder application 400 displayed by the screen display management unit 404 to thereby acquire user operational information. The screen display management unit 404 performs screen display control, such as an icon display of the electronic binder application 400, as the GUI of the electronic binder application 400, as exemplary shown FIG. 7.

The output control unit 401 performs instruction for output to the image processing apparatus 101 (102). More specifically, upon accepting an output instruction from a user through the input management unit 403, the output control unit 401 performs an output instruction to a printer driver to be allocated to a corresponding printer object based on that output instruction. In the case of a print instruction, the output instruction is performed to the printer driver for printing, whereas in the case of a facsimile transmission instruction, the output instruction is performed to the printer driver for facsimile transmission.

The printer driver that has accepted the instruction converts the electronic binder designated as the output instruction to output instruction information interpretable by the image processing apparatus 101 (102). Here, output instruction information refers to conversion to a data format for printing in the case of print output (for example, a PDL (Page Description Language) and the like). Then, the printer driver transmits the converted output instruction information as a print job to the image processing apparatus 101 (102) via the network 103.

The document processing control unit 402 inputs one or more mail files generated by the mail application via the input management unit 403, and incorporates the one or more files selected from among the mail files by a user to thereby create the electronic binder. Specifically, the document processing control unit 402 controls processing relating to a document such as processing for converting different electronic documents or e-mail data of which an extension differs to an unified electronic document format. In this specification, as described below with reference to FIG. 5, the unified the electronic document refers to one file of which file data or the like of which the extension differs is converted to be compatible with the data structure of the electronic binder. Upon accepting a document conversion instruction from a user through the input management unit 403, the document processing control unit 402 performs conversion processing based on the document conversion instruction. The document processing control unit 402 also carries out control to, for example, read an unconverted electronic document and e-mail data from the external memory 206, and write a converted electronic document to the external memory 206. Note that, hereinafter a document of the unified electronic document format is described as "electronic binder".

<Data Structure and Attribute Information of Electronic Binder>

Figure 5A:
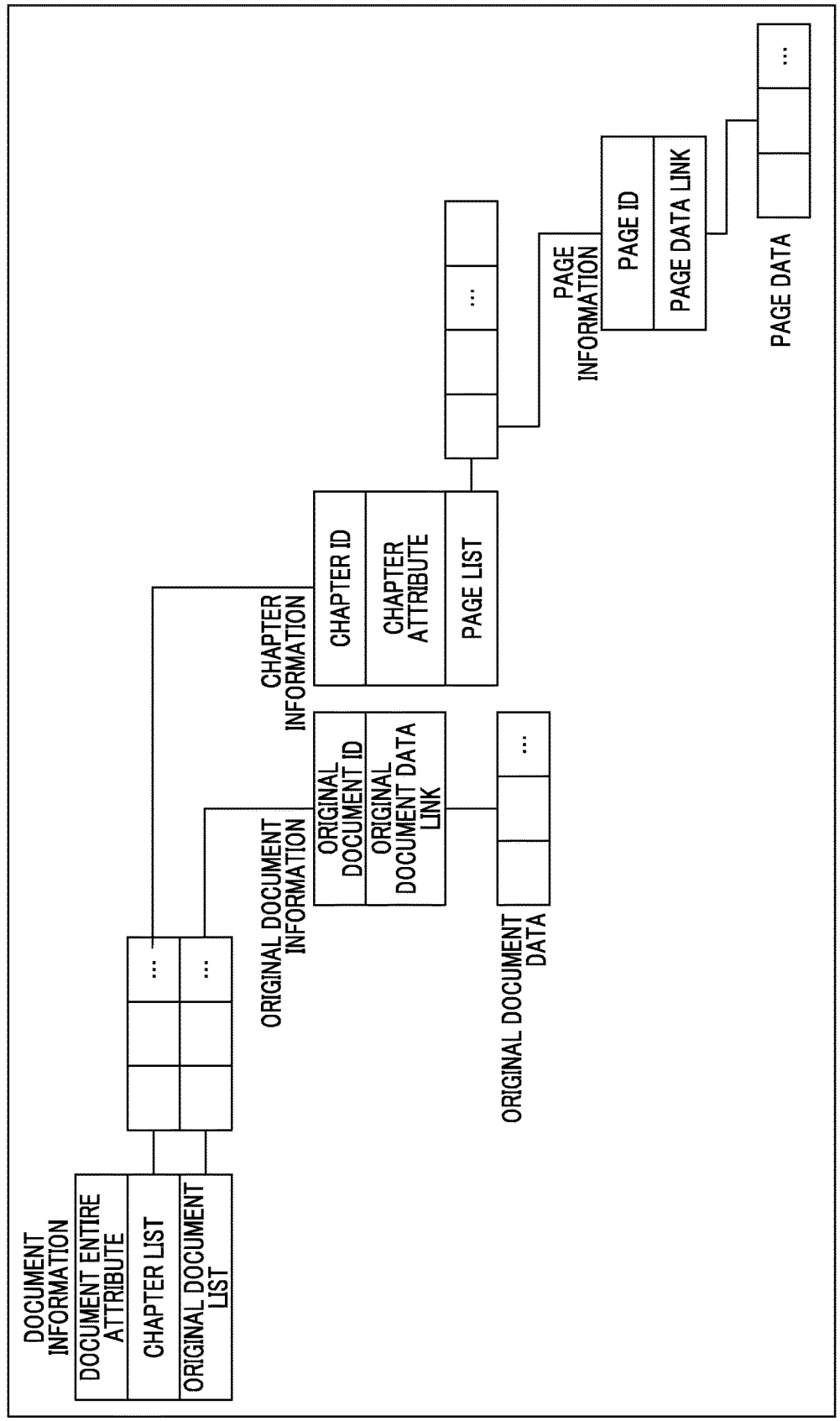

FIG. 5 is a diagram in which examples of a data structure of the electronic binder and contents of attribute information thereof are schematically illustrated. FIG. 5A illustrates the data structure of the electronic binder having a tree structure with three layers consisting of a sentence, a chapter and a page. One electronic binder has a document entire attribute, a chapter list, and an original document list. Links to multiple chapter information are retained in the chapter list. Links to multiple original document information are retained in the original document list. Here, the original document denotes a document before being converted to the electronic binder. By retaining the original document, an effect is obtained in which overall the mail file can be restored again using the original document in the case where, for example, data after being converted to the electronic binder is mistakenly deleted.

Each set of chapter information has a chapter ID, a chapter attribute, and a page list, respectively, and links to multiple page information are retained in the page list. The page information has a page ID and a page data link, respectively, and a link to material data of the page data are retained in the page data link. Each of original document information has an original document ID, an original document data link, respectively, and a link to material data of unconverted electronic document or e-mail data are retained in the original document data link.

FIG. 5B and FIG. 5C lists illustrating examples of the document entire attribute and the chapter attribute. Parameters set in the document entire attribute are valid throughout the electronic binder. On the other hand, parameters set in the chapter attribute are valid only in the pertinent chapter, and the chapter attribute has a priority over the document entire attribute even if the parameter is overlapped between the chapter attribute and the document entire attribute.

When a chapter specific attribute is included in the chapter attribute, a chapter specific setting flag is set so as to be ON, a parameter specific to the chapter is set in each setting item. When no chapter specific attribute is included in the chapter attribute, the chapter specific setting flag is set so as to be OFF, and NULL is set in each setting item.

<Conversion Example from Electronic Document to Electronic Binder>

Figure 6A:
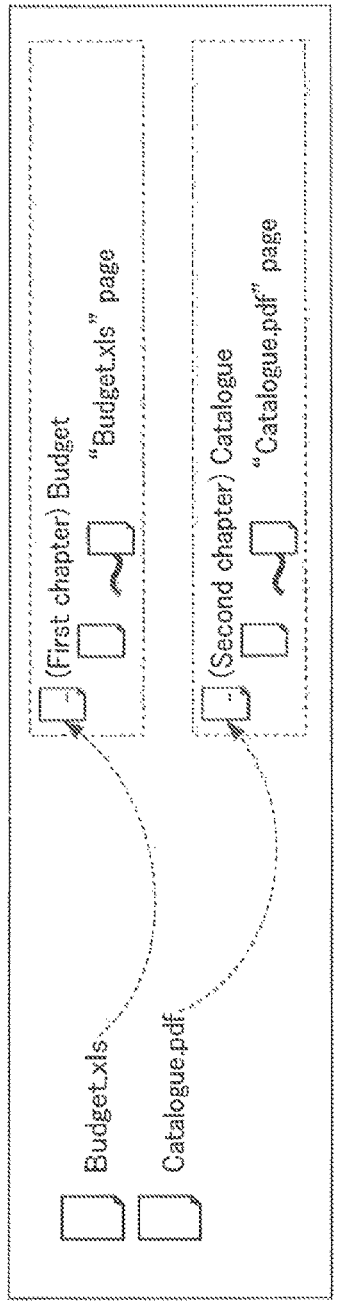
FIG. 6A and FIG. 6B illustrate examples when a plurality of electronic documents is converted to an electronic binder.

FIG. 6 is a diagram illustrating an example in which a plurality of different electronic documents and e-mail data is converted to the electronic binder. FIG. 6A illustrates a conversion example performed when a user performs a conversion operation in a state where a plurality of electronic documents "budget.xls" and "catalogue.pdf", each of which has different extension, has been selected. Each page of the "budget.xls" is added in a chapter in which a document name "budget" (of which its extension is excluded) is a chapter name. Each page of the "catalogue.pdf" is added in a chapter in which the document name "catalogue" (of which its extension is excluded) is a chapter name. That is, in FIG. 6A, the electronic binder containing each page of the "budget.xls" as a first chapter (chapter name: budget), and each page of the "catalogue.pdf" as a second chapter (chapter name: catalogue) is generated.

Figure 6B:
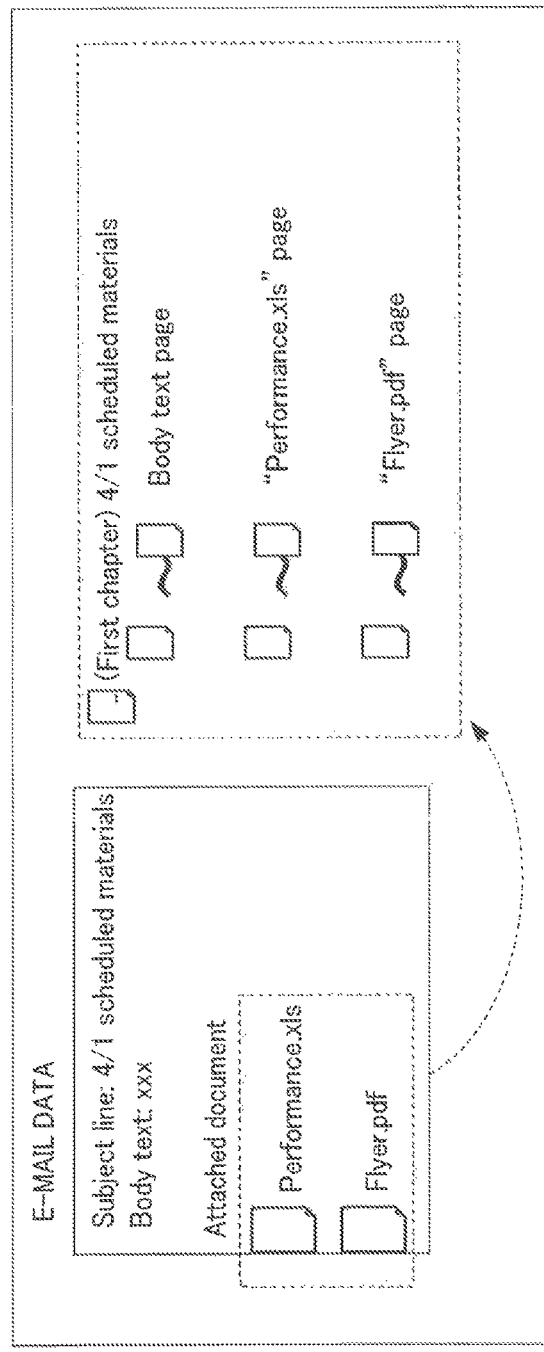

FIG. 6B illustrates a conversion example performed when a user performs a conversion operation in a state where e-mail data (a mail file) has been selected. A "performance.xls" and a "flyer.pdf" are attached to the e-mail data (the mail file) as an attached document. In this case, a text pages and pages of the attached documents "performance.xls" and "flyer.pdf" in the e-mail data are added to a chapter in which a subject line "4/1 scheduled materials" of the e-mail data is a chapter name. Even if the plurality of attached documents is attached to the e-mail data, the text and attached documents can be compiled and printed as a one job by converting the e-mail data to the electronic binder. That is, in FIG. 6B, the electronic binder containing the text pages and pages of the attached files (performance.xls and flyer.pdf) as the first chapter (chapter name: 4/1 scheduled materials) is generated. Naturally, the electronic binder containing all of budget.xls, catalogue.pdf, and the mail data can be generated. With this processing, the generated electronic binder contains each page of the "budget.xls" as the first chapter (chapter name: budget), and each page of the "catalogue.pdf" as the second chapter (chapter name: catalogue). Also, the electronic binder contains the text pages and the pages of the attached files (performance.xls and flyer.pdf) as a third chapter (chapter name: 4/1 scheduled materials).

<UI Example for Conversion Setting>

Figure 7:
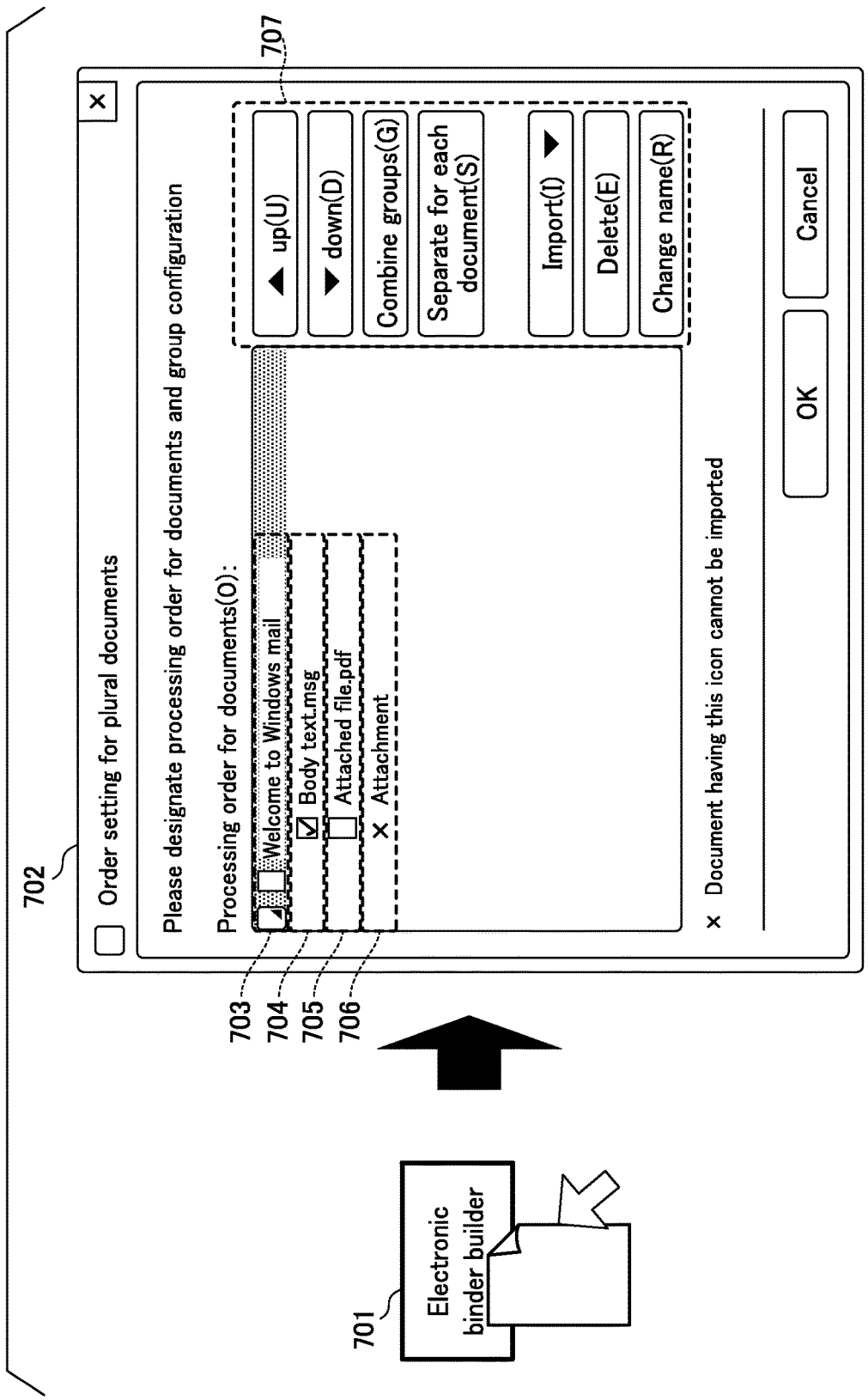
FIG. 7 illustrates a display example of an electronic document dragged and dropped into an icon.

FIG. 7 is a diagram in which a UI is schematically illustrated when a user drags and drops e-mail data (a mail file) on an icon 701 indicating the electronic binder application 400. The e-mail data (the mail file) includes, for example, an msg file representing mail data for Outlook (Registered) by Microsoft Corporation. When the user drags and drops the e-mail data on the icon 701 representing the electronic binder application 400, a dialogue 702 for performing a conversion setting is displayed. Hereinafter, this dialogue 702 is described as a "conversion setting dialogue". Information (reference numerals 703 to 705) about the dragged and dropped data is displayed on the conversion setting dialogue 702.

Reference numeral 703 indicates the subject line of the e-mail data, and reference numeral 704 indicates the body text of the e-mail data. Reference numeral 705 indicates the attached document "the attached file.pdf", which is attached to the e-mail data. Reference numeral 706 is the attached document "attached", which is attached to the e-mail data, but since a document having no extension cannot be converted to the electronic binder in this embodiment, an x mark indicating inconvertibility is displayed to the left of a document icon. A display method for reporting that conversion is impossible is not limited to the x mark display, but a method, for example, of changing a color in a display portion of a file name, displaying the file name with strike-through, or the like may be employed.

Reference numeral 707 indicates a control group with which conversion settings are changeable, and a user can designate a print order when the document is printed, delete the document from a conversion target, or the like through by an operation though these controls. Also, by dragging and dropping the document or the e-mail data on the conversion setting dialogue 702, the document or the e-mail data can be added to the chapter. When a user presses an OK button, the electronic binder is generated based on the set contents. The user can delete an unnecessary document (for example, the text.msg or the attached file.pdf) or change the print order of the document by using the dialogue 702.

<Conversion Setting Example>

Figure 8:
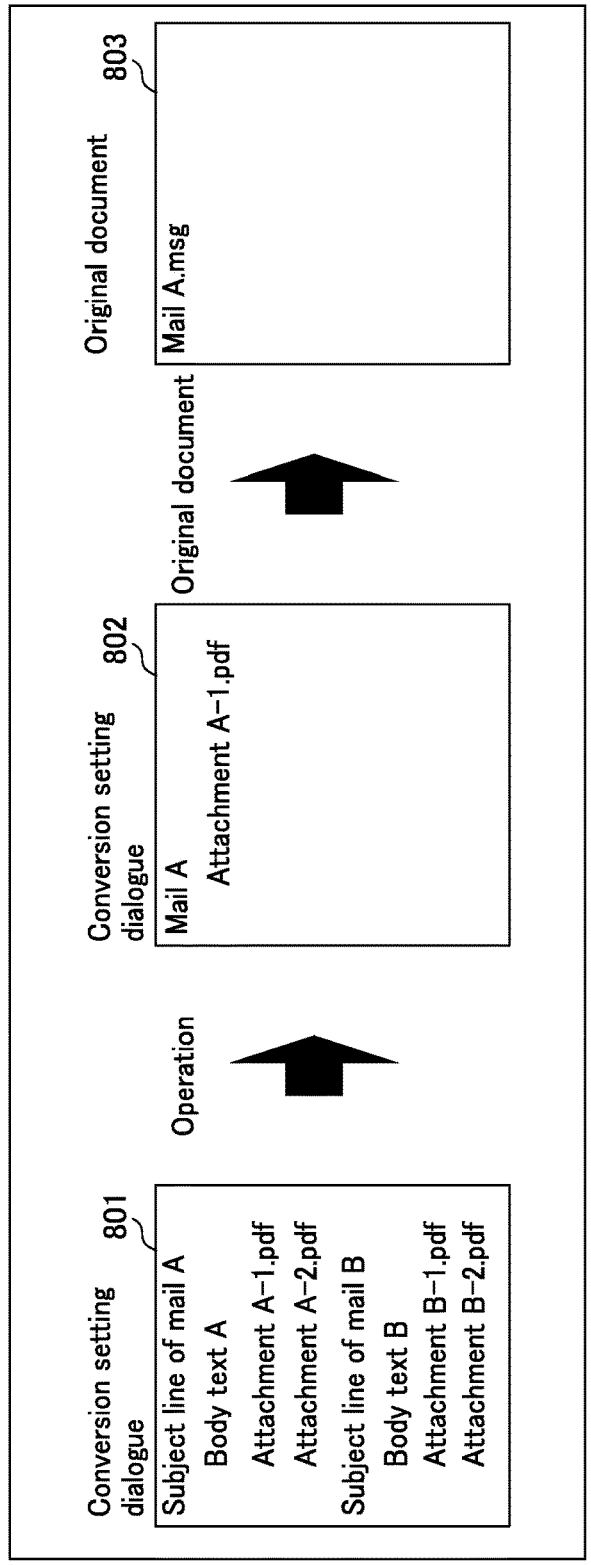
FIG. 8 illustrates a screen example of document conversion settings in a conversion setting dialogue.

FIG. 8 is a diagram illustrating the electronic document and the original document stored in the electronic binder when a user performs a conversion setting with the conversion setting dialogue displayed in a screen of a PC. A dialogue 801 indicates a conversion setting dialogue displayed when the user drops a "mail A.msg" and a "mail B.msg" on the icon of the electronic binder application. The dialogue 801 corresponds to areas in which the reference numerals 703 to 706 in FIG. 7 are displayed. An "attachment A-1.pdf" and an "attachment A-2.pdf" are attached to the "mail A.msg" as the attached document, and "attachment B-1.pdf" and "attachment B-2.pdf" are attached to the "mail B.msg" as attached documents.

Note that, in addition to the mail data, further mail data is attachable to the msg file. In that case, the attached mail file is also expanded and displayed on the conversion setting dialogue. For example, when a "mail D.msg" is attached to a "mail C.msg", and an "attachment D-1.pdf" is attached to the "mail D.msg", a "body text C", a "body text D" and the "attachment D-1.pdf" are displayed in a chapter "subject line of mail C".

The dialogue 802 indicates a dialogue after a user has carried out an operation for the dialogue 801. By the user operation, the "body text A", the "attachment A-2.pdf", the "body text B", the "attachment B-1.pdf", and the "attachment B-2.pdf" are deleted. When the user presses the OK button in FIG. 7 in a state of the dialogue 802 in FIG. 8, the electronic binder containing each page of the "attachment A-1.pdf" as the first chapter (chapter name: a subject line of the mail A) is generated.

A dialogue 803 is a diagram illustrating an original document list stored in the electronic binder when the electronic binder is generated from the state of the dialogue 802. The "mail A.msg" retaining not only the "attachment A-1.pdf" to be converted but also the "body text A" and the "attachment A-2.pdf" before deletion is stored in the electronic binder as the original document. As described above, the electronic binder application 400 stores only the mail data containing the document to be converted in the electronic binder as the original document. That is, in the example of FIG. 8, since the document to be converted is only "attachment A-1.pdf", the mail A containing "attachment A-1.pdf" is stored as the original document, whereas the mail B is not stored. As stated above, the link to the material data of the electronic document and the e-mail data before conversion are retained in the electronic binder. Thus, even if a portion of the mail is mistakenly deleted, a user can restore the electronic binder or overall the mail file again by using the original document. Also, assuming that the electronic binder application 400 can display a file name of the original document on the UI, a user can confirm the mail data to be converted by using this UI.

<Processing Flow when Electronic Document is Converted to Electronic Binder>

Figure 9:
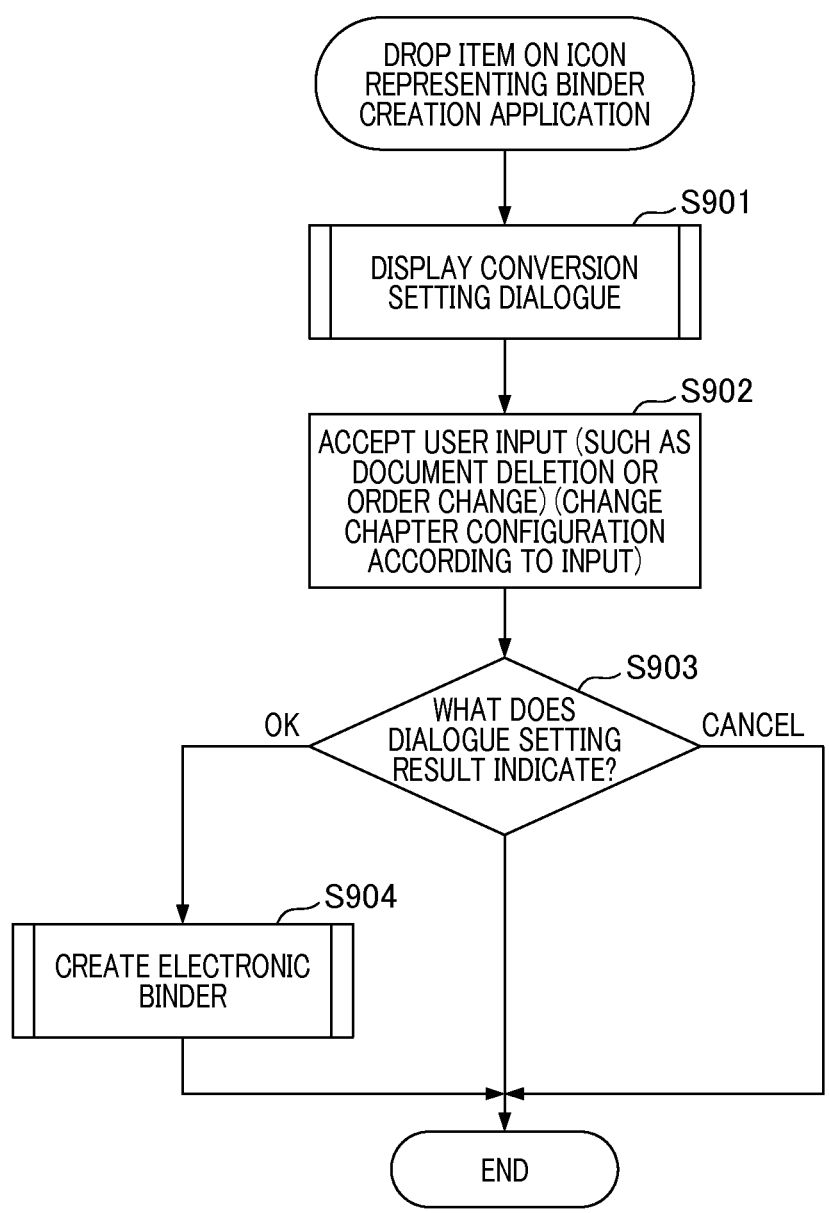
FIG. 9 is a flow diagram for electronic binder creation by a drag- and drop.

FIG. 9 is a processing flow when the electronic binder application 400 converts the plurality of different electronic documents and e-mail data to the electronic binder. The respective steps in this flowchart are realized by the CPU 201 by loading the electronic binder application 400 stored in the ROM 204 or the external memory 206, and executing them.

Firstly, the document processing control unit 402 displays the conversion setting dialogue 702 on the display unit 202 (S901). A processing flow when the conversion setting dialogue 702 is displayed is described below with reference to FIG. 10. Next, the document processing control unit 402 accepts an input such as a conversion instruction by a user with respect to the conversion setting dialogue 702, and executes processing according to the input contents (S902). That is, as described with reference to FIG. 7 and FIG. 8, selection, deletion, or order change, or the like for conversion target data (such as a mail body text and an attached file) is performed. The conversion setting dialogue 702 ends when the user presses an OK button or a Cancel button. The document processing control unit 402 identifies which of the OK button or the Cancel has been pressed (S903), and when an identification result indicates OK, the document processing control unit 402 creates the electronic binder (S904) and ends the processing flow. FIG. 11 shows the electronic binder creation processing flow. The detail of the processing flow is described below. When the identification result indicates "Cancel", the document processing control unit 402 ends the processing flow.

<Processing Flow when a Conversion Setting Dialogue is Displayed>

Figure 10:
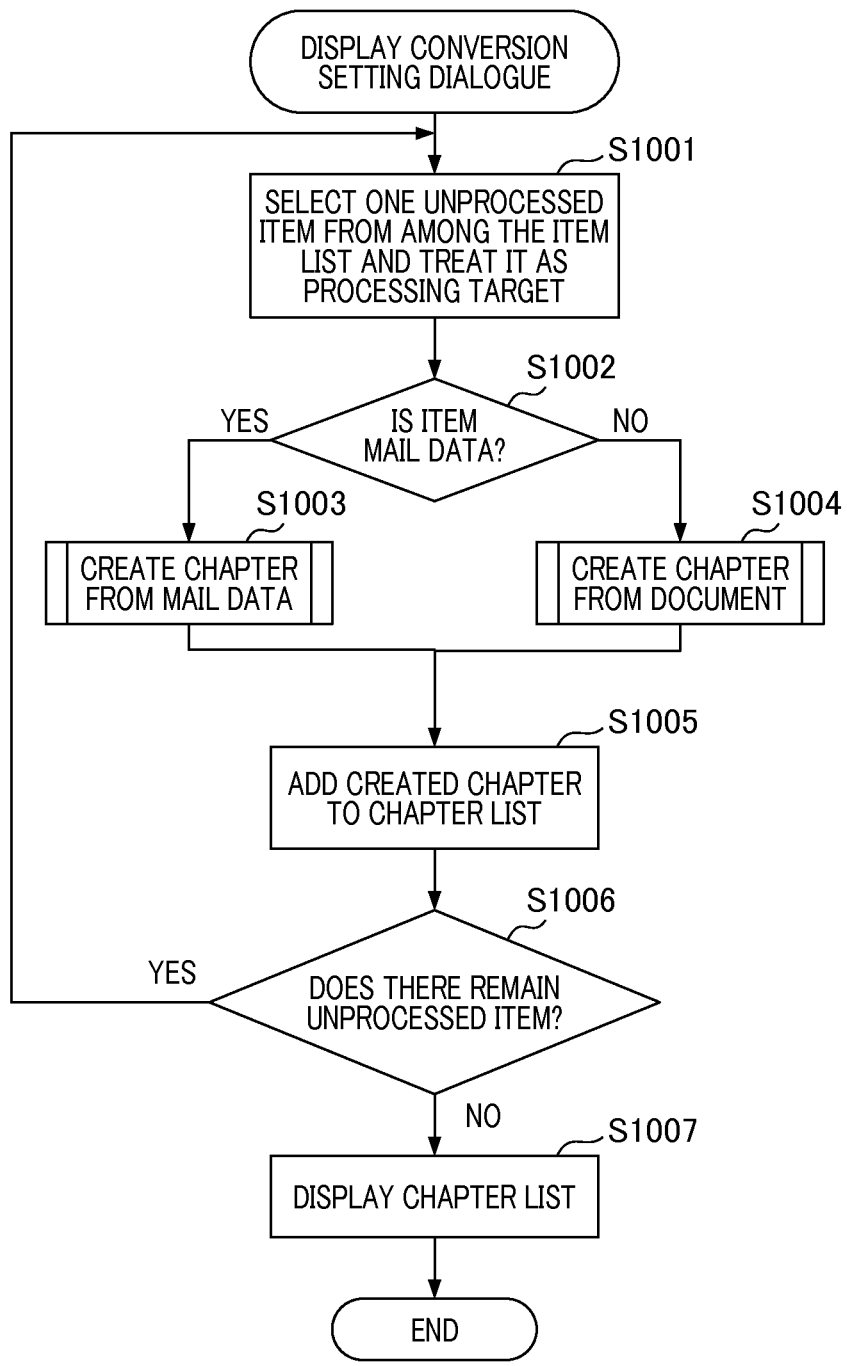
FIG. 10 illustrates a flow until a conversion setting dialogue is displayed on a screen.

FIG. 10 is a diagram illustrating a processing flow when the electronic binder application 400 displays the conversion setting dialogue (that is, the processing flow illustrating the details in S901 of FIG. 9). In the processing flow, the electronic binder application 400 creates a chapter list from an item list. The item refers to dropped data. For example, the budget.xls, the catalogue.pdf, and the mail data respectively shown in FIG. 6B are items.

Figure 11A:
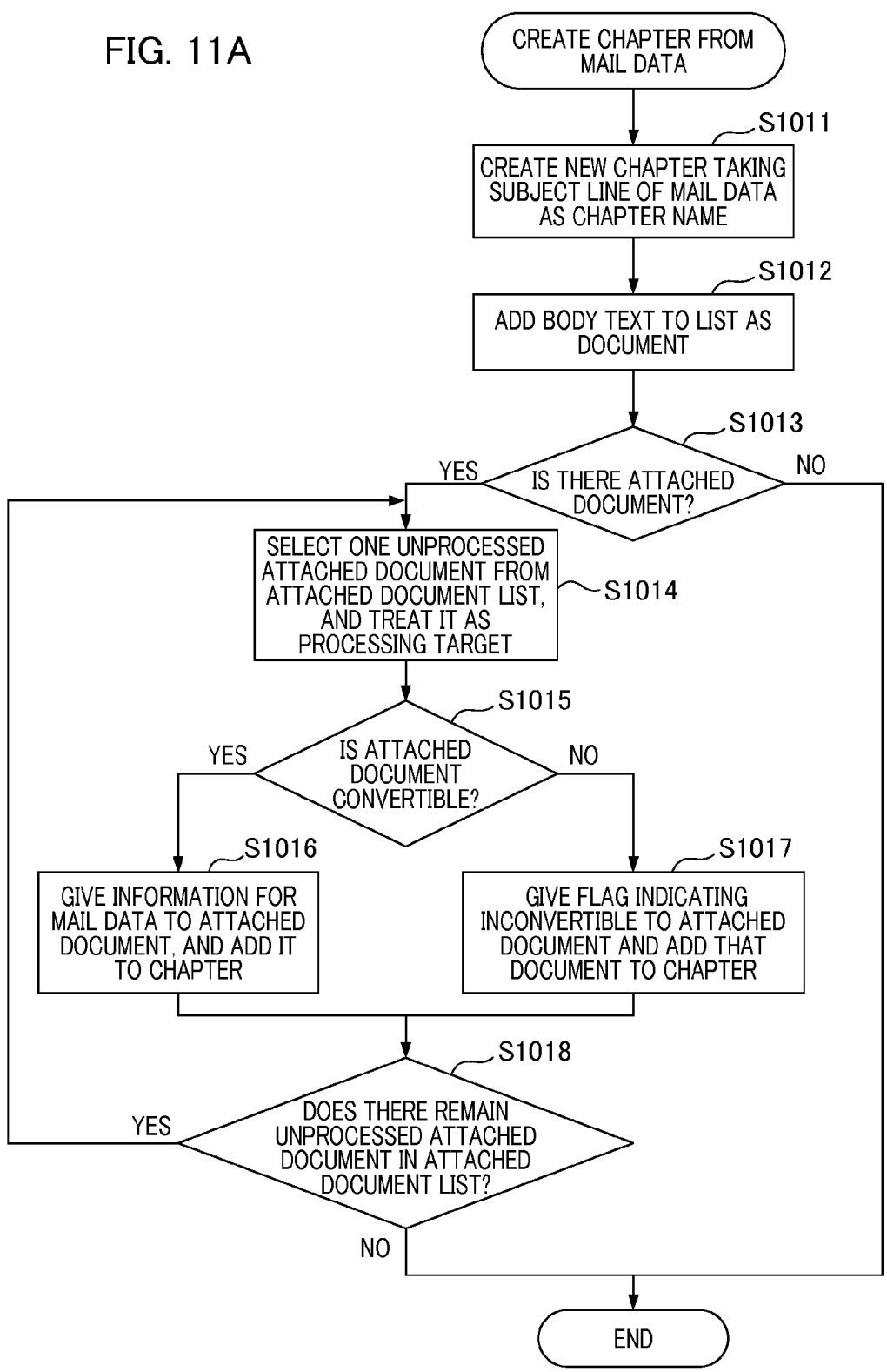
FIG. 11A and FIG. 11B are diagrams of processing flows when a chapter of an electronic binder is created.
Figure 11B:
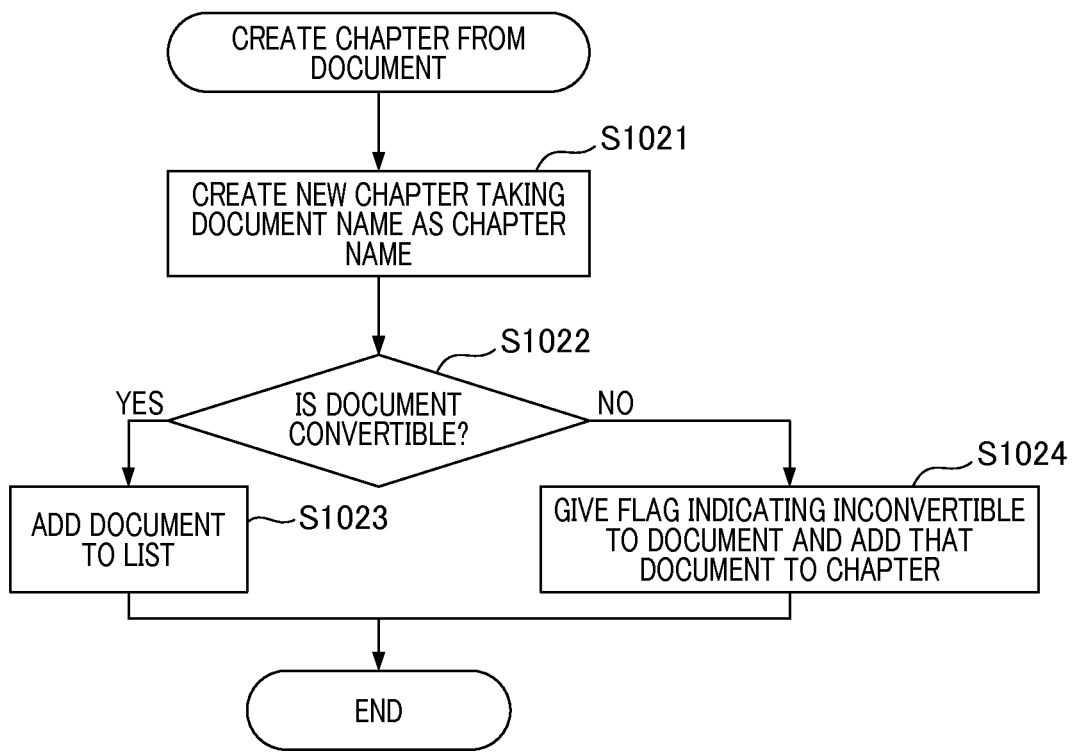

Firstly, a description will be given of the processing flow in FIG. 10. The processing flow illustrates the overall processing flow when the conversion setting dialogue is displayed, and the detailed flow of each step is illustrated in FIG. 11A and FIG. 11B.

Firstly, the document processing control unit 402 selects one unprocessed item from the item list as a processing target (S1001). Next, the document processing control unit 402 determines whether or not the item to be processed is mail data (a mail file) (S1002). A determination method includes a method of determining the item based on an identifier of the pertinent item. In the present embodiment, the item of which the identifier representing "msg" is determined as the mail data, whereas identifiers other than "msg" are determined as not the mail data. When the item is the mail data (YES), the document processing control unit 402 creates a chapter from the mail data (S1003). The detail of the processing flow in S1003 is shown in FIG. 11A, and that detail is described below.

Next, the document processing control unit 402 adds the created chapter to the chapter list (S1005), and confirms whether there remains an unprocessed item (S1006). When there remains an unprocessed item (YES), the document processing control unit 402 repeats the processing after the processing in S1001. When there remains no unprocessed item (NO), the document processing control unit 402 displays the chapter list on the conversion setting dialogue (S1007), and ends the processing flow. When the item is not the mail data but is document data in a branch in S1002 (NO), the document processing control unit 402 creates a list for the document data (S1004). The detailed processing flow in S1004 is shown in FIG. 11B, and that detail is described below. Then, the document processing control unit 402 executes processing after the processing in S1005.

Next, a description will be given of the processing flow shown in FIG. 11A. FIG. 11A illustrates the processing flow when the document processing control unit 402 creates a chapter from mail data. Firstly, the document processing control unit 402 creates a new chapter taking the subject line of the mail data as the chapter name (S1011). Next, the document processing control unit 402 adds a body text to the chapter as the document that is one file unit (S1012). Next, the document processing control unit 402 determines whether an attached document is attached to the mail data (S1013). In the present embodiment, assume the attached document is either mail data or the electronic document. When the attached document exists (YES), the document processing control unit 402 selects one unprocessed attached document from the attached document list, and treats it as a processing target (S1014).

Next, the document processing control unit 402 confirms whether the attached document is capable of being converted to an electronic binder (S1015). As stated above, in this embodiment, a document including no extension is incapable of being converted to an electronic binder. When the attached document is capable of being converted to an electronic binder (YES) the document processing control unit 402 provides information for the mail data to the attached document, and adds the attached document to which the pertinent mail data information is added to the chapter (S1016). Here, the information for the mail data is information for uniquely specifying the mail data, and includes, for example, a file path for the mail data.

Next, the document processing control unit 402 confirms whether an unprocessed attached document remains in the attached document list (S1018). When the unprocessed attached document remains (YES), the document processing control unit 402 repeats the processing after the processing in S1014. When no unprocessed attached document remains (NO), the document processing control unit 402 ends the processing flow. When no attached document remains in a branch in S1013, the document processing control unit 402 ends the processing flow. When the attached document is incapable of being converted to the electronic binder in a branch in S1015, the document processing control unit 402 adds the attached document to which the flag indicating inconvertible is given to the chapter (S1017), and executes processing after the processing in S1018.

Next, a description will be given of the processing flow shown in FIG. 11B. FIG. 11B illustrates the processing flow when the document processing control unit 402 creates a chapter from a document (data other than mail data). Firstly, the document processing control unit 402 creates a new chapter taking a document name as the chapter name (S1021). Next, the document processing control unit 402 confirms whether the document is capable of being converted to the electronic binder (S1022). When the document is capable of being converted to an electronic binder (YES), the document processing control unit 402 adds the document to the chapter (S1023). When the document is incapable of being converted to an electronic binder, the document processing control unit 402 adds the document to which the flag indicating inconvertible to the chapter (S1024), and ends the processing flow.

<Processing Flow when Electronic Binder Data is Created>

FIG. 12 is a diagram illustrating a processing flow when the electronic binder application 400 creates electronic binder data (that is, the processing flow illustrating details in S904 of FIG. 9).

Firstly, the document processing control unit 402 acquires a chapter list (S1101). Next, the document processing control unit 402 deletes a document to which an inconvertible flag is given from the chapter list (S1102). Next, the document processing control unit 402 selects one unprocessed document from the chapter list, and treats it as a processing target (S1103). For example, in the example shown in FIG. 8, the "attachment A-1.pdf" is acquired as the processing target. Next, the document processing control unit 402 confirms whether the document acquired in S1103 is a document included in the mail data (S1104). Here, a confirmation method includes an example of determining whether information for the mail data (that is, information given in S1016) has been added. When information for the mail data has been added, it is determined that the document to be processed is included in the mail data, otherwise it is determined that the document to be processed is not included in the mail data. When the document is not included in the mail data (NO), the document processing control unit 402 adds the document to the original document list (S1105).

Next, the document processing control unit 402 determines whether an unprocessed document remains in the chapter list (S1109). When the unprocessed document remains (YES), the document processing control unit 402 repeats the processing after the processing in S1103. When no unprocessed document remains (NO), the document processing control unit 402 creates a print target data part of the electronic binder from the chapter list (S1110). The creation of the print target data part means creation of material data of page data and creation of the chapter list of the electronic binder. When the material data is created from the body text of the mail, the document processing control unit 402 generates a PDF file based on texts of the subject line and the body text of the mail, and treats the PDF file as the actual data. Next, the document processing control unit 402 creates an original document data part of the electronic binder from the original document list (S1111), and ends the processing flow. The creation of the original document data part means a creation of the original document list of the electronic binder.

When the document is included in the mail data in a branch in S1104 (YES), the document processing control unit 402 acquires the mail data in which the document is stored (S1106). Here, the mail data is acquired by using the information for the mail data added to the document. In the example shown in FIG. 8, since the mail data in which the "attachment A-1.pdf" is stored is the "mail A.msg", the "mail A.msg" file is acquired by using the path added in S1016 (S1106). Next, the document processing control unit 402 confirms whether the mail data exists in the original document list (S1107). When the mail data exists in the original document list, the document processing control unit 402 executes processing after the processing in S1109. When no mail data exists in the original document list, the document processing control unit 402 adds the mail data to the original document list (S1108), and executes the processing after the processing in S1109. In the example shown in FIG. 8, it is determined whether the "mail A.msg" exists in the original document list. When no "mail A.msg" exists, the "mail A.msg" is acquired and added to the original document list. With the aforementioned processing, when either the body text or the attached document in the mail data is included in the conversion target, the mail data is stored in the original document. On the other hand, when neither the body text nor the attached document in the mail data is included in the conversion target, the mail data is not stored in the original document.

When a user inputs a print instruction using the electronic binder application throughout the processing above after the electronic binder is generated, the electronic binder application transmits the selected electronic binder to the printer driver of a designated image processing apparatus. Then, the printer driver generates a print job (PDL) based on the electronic binder, and transmits it to the image processing apparatus. Hence, for example, when the body text of mail data and the plurality of attached files are included in the electronic binder, the body text and attached files are processed as one print job.

As described above, in printing for an e-mail in which one or more attached files are attached, by converting e-mail data to the electronic binder and printing it, the body text and the attached document in the e-mail can be collectively printed as one job. In addition, according to the information processing apparatus of the present invention, the electronic binder to be printed can be created based on files selected by a user from among files relating to the e-mail along with the attached files by a user, which can prevent unnecessary printing.

Second Embodiment

In the first embodiment, one example is illustrated in which the conversion setting dialogue is displayed and the electronic binder is created when a user drags and drops the e-mail data on the icon representing the electronic binder application. The user can select documents to be converted on the conversion setting dialogue, and unnecessary printing is prevented. However, there is a case where the user wants to immediately print all documents included in the mail data without selecting documents to be converted. In a second embodiment, an example is given in which all documents included in the mail data are immediately printed.

In the following, a description will be given of differences of the processing by the electronic binder application 400 between the first embodiment and the second embodiment with reference to a flowchart in FIG. 13. A configuration of the electronic binder application 400 in the second embodiment is the same as that of the electronic binder application 400 in the first embodiment unless otherwise stated.

Figure 13:
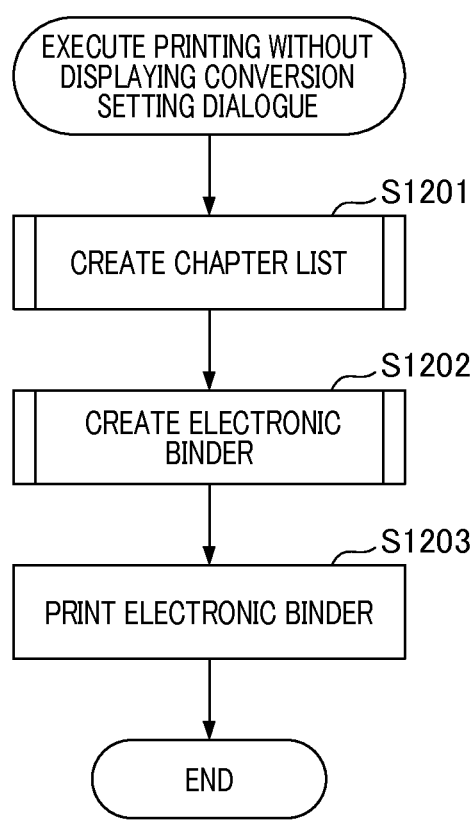
FIG. 13 is a diagram when printing is performed without displaying the conversion setting dialogue.

FIG. 13 illustrates a processing flow for immediately printing all documents included in mail data without displaying the conversion setting dialogue. In the first embodiment, the electronic binder is created taking the fact that the user drags and drops the e-mail data on the icon representing the electronic binder application as a trigger. In the second embodiment, it is assumed that this processing flow is triggered when the e-mail data is dragged and dropped on the icon representing an easy print application. Here, assume the easy print application functions as the electronic binder application 400 but is an application that enables easy printing without displaying the conversion setting dialogue. Note that the trigger factor is not limited to the aforementioned trigger but another trigger in which for example, the mail data is dropped on the icon representing the electronic binder application while the user keep pressing a specific key (such as a Shift key) may be employed.

Firstly, the document processing control unit 402 creates a document list for printing (S1201). The list creation processing is the same as that in S1001 to S1006 of FIG. 10. Next, the document processing control unit 402 creates an electronic binder from the document list (S1202). This processing is the same as that in S1101 to S1111 of FIG. 12. Finally, the document processing control unit 402 prints the electronic binder created in S1202 through the output control unit 401 (S1203).

As described above, immediate printing for all documents included in the mail data is enabled without displaying the conversion setting dialogue.

Third Embodiment

In the first embodiment, one example is illustrated in which the file name of the mail data is displayed on the UI if the original document is the mail data when the original document list is displayed on the UI. However, there is a case where a convenience for a user is lost due to the fact that conversion target documents are invisible when the only file name of the mail data is displayed. In the third embodiment, an example is given in which the convenience for the user is enhanced by displaying conversion target documents in an identifiable format if the original document is the mail data when the original document list is displayed on the UI.

In the following, a description will be given of differences between the processing by the electronic binder application 400 in the first embodiment and the third embodiment with reference to a flowchart in FIG. 14. A configuration of the electronic binder application 400 in the third embodiment is the same as that of the electronic binder application 400 in the first embodiment unless otherwise stated.

Figure 14:
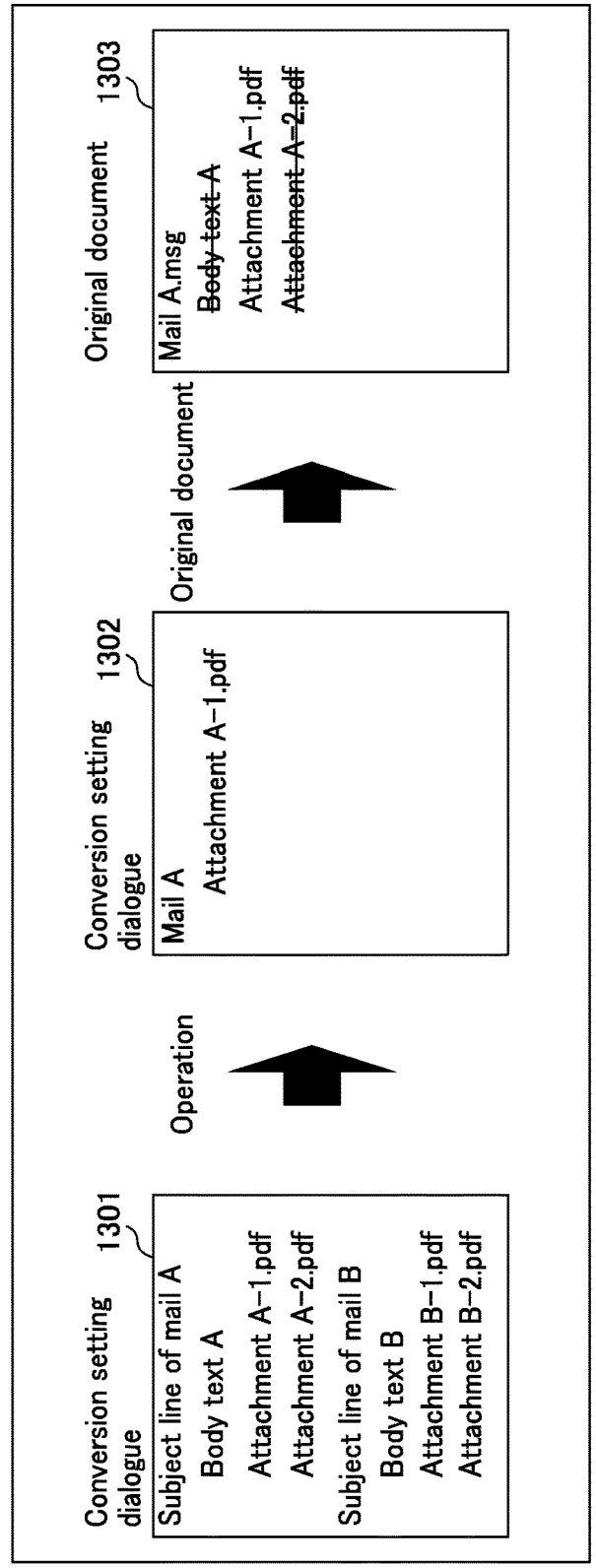
FIG. 14 illustrates another screen example of the document conversion settings in the conversion setting dialogue.

FIG. 14 illustrates a diagram showing how the original documents that are stored in the electronic binder are displayed when a user performs conversion settings on the conversion setting dialogue, and the electronic binder is generated. Respective dialogues 1301 and 1302 are the same as the dialogues 801 and 802 shown in FIG. 8. A dialogue 1303 is a diagram illustrating a list of original documents stored in the electronic binder when the electronic binder is generated based on the state of the dialogue 1302. In contrast to the dialogue 803, not only the file name of the mail data but names of the documents included in the mail data are displayed on the dialogue 1303. Further, among the documents included in the mail data, documents that are not the conversion target are displayed with a strike-through, so that the conversion target document is identifiably displayed. The method for displaying the conversion target document in the identifiable format is not limited to the above method, but a method, for example, for displaying the conversion target document with highlighting, by color for each document, or the like may be employed. Also, the determination of whether or not a document among the documents included in the mail data is a conversion target is performed by determining whether the pertinent document is included in the chapter list created in S1001 to S1007.

As described above, the convenience for the user is enhanced by displaying conversion target documents in an identifiable format if the original document is the mail data when the original document list is displayed on the UI.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-095478, filed Apr. 30, 2013 which is hereby incorporated by reference herein in its entirety.

What is claimed is:

1. An information processing apparatus comprising:
a display unit configured to display a conversion setting screen of an electronic binder application when a plurality of mail files generated by a mail application are dragged-and-dropped from the mail application to the electronic binder application based on a first user's operation, wherein the display unit displays, on the conversion setting screen, a list that includes, as individual documents, a plurality of mail body texts and a plurality of attached files that are included in the dragged-and-dropped plurality of mail files, and wherein the individual documents are displayed in the list so that it is identified that each of the dragged-and-dropped mail files includes which mail body text and attached file;

a selection unit configured to select, based on a second user's operation on the conversion setting screen, at least one document to be incorporated in an electronic binder from among the displayed list of the individual documents that comprise the plurality of mail body texts and the plurality of attached files included in the dragged-and-dropped plurality of mail files, wherein the mail body texts and the attached files displayed as the individual documents in the list are selectable individually based on the second user's operation on the conversion setting screen, and wherein the selection unit further changes an order of the selected documents to be incorporated in the electronic binder responsive to if a user instruction to change an order of the selected documents; and a creation unit configured to create the electronic binder by converting a mail body text and/or an attached file corresponding to the at least one selected document together with any change in order by the selection unit.

2. The information processing apparatus according to claim 1, wherein the display unit displays the plurality of mail body texts and the plurality of attached files included in the dragged-and-dropped plurality of mail files as a chapter list so that it is identified that each of the dragged-and-dropped mail files includes which mail body text and attached file.

3. The information processing apparatus according to claim 2, wherein a subject line of each of the dragged-and-dropped mail files is represented in the chapter list displayed by the display unit as a chapter name, and the mail body text and the attached file included in each of the dragged-and-dropped mail files are added to each corresponding chapter in the chapter.

4. The information processing apparatus according to claim 1, wherein the display unit determines whether each of the attached files is capable of being converted to the electronic binder, and adds a flag indicating inconvertible to an attached file that is determined to be inconvertible and displays the flag.

5. The information processing apparatus according to claim 1, wherein the creation unit further adds, to the electronic binder, an original file corresponding to the at least one document selected by the selection unit.

6. The information processing apparatus according to claim 1, wherein, if the plurality of mail files and an electronic document different from the mail files are dragged-and-dropped to the electronic binder application based on the first user's operation, the display unit displays, on the conversion setting screen, the list of the individual documents that comprise the plurality of mail body texts and the plurality of attached files included in the dragged-and-dropped plurality of mail files, and the dragged-and-dropped electronic document, the selection unit selects, based on the second user's operation, at least one document to be incorporated in the electronic binder from among the displayed list of the individual documents that comprise the plurality of mail body texts, the plurality of attached files and the dragged-and-dropped electronic document.

7. The information processing apparatus according to claim 1, further comprising a print unit configured to execute printing processing about the electronic binder created by the creation unit.

8. A control method of an information processing apparatus comprising:
   displaying a conversion setting screen of an electronic binder application when a plurality of mail files generated by a mail application are dragged-and-dropped from the mail application to the electronic binder application based on a first user's operation, wherein the conversion setting screen displays a list that includes, as individual documents, a plurality of mail body texts and a plurality of attached files included in the dragged-and-dropped plurality of mail files, and wherein the individual documents are displayed in the list so that it is identified that each of the dragged-and-dropped mail files includes which mail body text and attached file;
   selecting, based on a second user's operation on the conversion setting screen, at least one document to be incorporated in an electronic binder from among the displayed list of the individual documents that comprise the plurality of mail body texts and the plurality of attached files included in the dragged-and-dropped plurality of mail files, wherein the mail body texts and the attached files displayed as the individual documents in the list are selectable individually based on the second user's operation on the conversion setting screen, and wherein, in the selecting, an order of the selected documents to be incorporated in the electronic binder is further changed responsive to if a user instruction to change an order of the selected documents; and
   creating the electronic binder by converting a mail body text and/or an attached file corresponding to the at least one selected document together with any change in order in the selecting.

9. A non-transitory storage medium on which is stored a computer program for making a computer execute a control method of an information processing apparatus comprising:
   displaying a conversion setting screen of an electronic binder application when a plurality of mail files generated by a mail application are dragged-and-dropped from the mail application to the electronic binder application based on a first user's operation, wherein the conversion setting screen displays a list that includes, as individual documents, a plurality of mail body texts and a plurality of attached files included in the dragged-and-dropped plurality of mail files, and wherein the individual documents are displayed in the list so that it is identified that each of the dragged-and-dropped mail files includes which mail body text and attached file;
   selecting, based on a second user's operation on the conversion setting screen, at least one document to be incorporated in an electronic binder from among the displayed list of the individual documents that comprise the plurality of mail body texts and the plurality of attached files included in the dragged-and-dropped plurality of mail files, wherein the mail body texts and the attached files displayed as the individual documents in the list are selectable individually based on the second user's operation on the conversion setting screen, and wherein, in the selecting, an order of the selected documents to be incorporated in the electronic binder is further changed responsive to if a user instruction to change an order of the selected documents; and
   creating the electronic binder by converting a mail body text and/or an attached file corresponding to the at least one selected document together with any change in order in the selecting.

10. The non-transitory storage medium according to claim 9, wherein, in the displaying, the plurality of mail body texts and the plurality of attached files included in the dragged-and-dropped plurality of mail files is displayed as a chapter list so that it is identified that each of the dragged-and-dropped mail files includes which mail body text and attached file.

11. The non-transitory storage medium according to claim 10, wherein a subject line of each of the dragged-and-dropped mail files is represented as a chapter name when the chapter list is displayed, and the mail body text and the attached file included in each of the dragged-and-dropped mail files are added to each corresponding chapter in the chapter list.

12. The non-transitory storage medium according to claim 9, wherein, in the displaying, whether each of the attached files is capable of being converted to the electronic binder is further determined, a flag indicating inconvertible is added to the attached file that is determined to be inconvertible, and the flag is displayed.

13. The non-transitory storage medium according to claim 9, wherein, in the creating, an original file corresponding to the at least one document selected in the selecting is further added to the electronic binder.

14. The non-transitory storage medium according to claim 9, wherein, if the plurality of mail files and an electronic document different from the mail files are dragged-and-dropped to the electronic binder application based on the first user's operation,
   in the displaying, the list of the individual documents that comprise the plurality of mail body texts and the plurality of attached files included in the dragged-and-dropped plurality of mail files, and the dragged-and-dropped electronic document are displayed on the conversion setting screen, and
   in the selecting, at least one document to be incorporated in the electronic binder is selected, based on the second user's operation, from among the displayed list of the individual documents that comprise the plurality of mail body texts, the plurality of attached files, and the dragged-and-dropped electronic document.

15. The non-transitory storage medium according to claim 9 further comprising executing printing processing about the electronic binder created in the creating.

* * * * *